E. DELAY.
CATTLE MARK.
APPLICATION FILED OCT. 14, 1920.
1,390,342.
Patented Sept. 13, 1921.
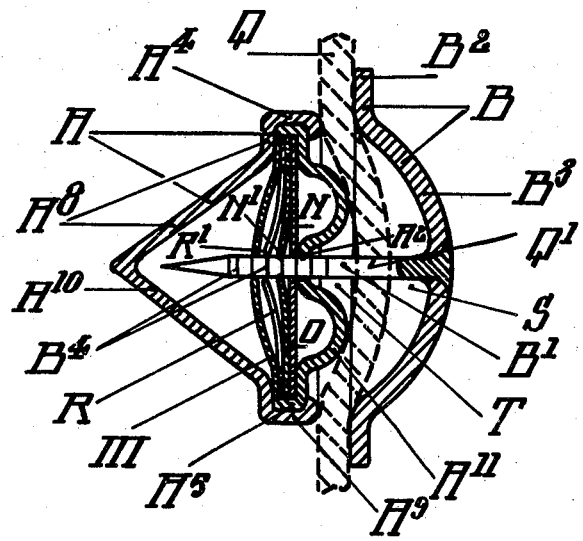
INVENTOR:
Eugène Delay
By Lawrence Langner
ATTORNEY.

UNITED STATES PATENT OFFICE.

EUGÈNE DELAY, OF GENEVA, SWITZERLAND.

CATTLE-MARK.

1,390,342.  Specification of Letters Patent.  Patented Sept. 13, 1921.

Application filed October 14, 1920. Serial No. 416,905.

*To all whom it may concern:*

Be it known that I, EUGÈNE DELAY, citizen of Switzerland, residing at Geneva, Canton of Geneva, in the Confederation of Switzerland, have invented certain new and useful Improvements in Cattle-Marks, of which the following is a specification.

My invention relates to cattle marks and has for its object to provide a device of this character which is more efficient than prior known constructions.

The above object is attained by the novel construction and arrangement of parts to be hereinafter described and claimed.

The invention is illustrated in the accompanying drawing in which the figure represents a transverse sectional view of the device applied to the ear of an animal.

Referring to the drawings the male part B of the device comprises a piece of soft metal, for instance of aluminum, having the form of a bowl $B^3$ provided with a circular plane rim $B^2$. A bar $B^1$ made of a hard metal, for instance of steel or hardened steel, is fixed at one of its extremities to the part $B^2$—$B^3$. The other end of the bar $B^1$ is provided with a series of parallel circumferential grooves $B^4$. The female part A is also made of aluminum and comprises two pieces $A^8$ and $A^9$. The piece $A^8$ is provided with a conical portion $A^{10}$ and a cylindrical rim $A^4$ while the piece $A^9$ has the general form of a disk provided with a cylindrical rim $A^5$ and an annular shoulder $A^{11}$ of a cross section practically semicircular and of a height reaching partly into the bowl $B^3$. The rim $A^4$ is bent over the rim $A^5$ in order to hold the parts $A^8$ and $A^9$ together. In the interior of this second rim $A^5$ are the borders of the plates M, O, between which are lodged two disks N, R, which are made of a hard metal, for instance of steel, and which are cut out in order to form the teeth $N^1$, $R^1$.

The teeth of each of these disks are displaced by about 60° from those of the other disk, so that they are in no way a hindrance one to the other. The different plates or disks have a certain play in rim $A^5$ so that they can freely turn in it.

In the use of the device the pointed bar $B^1$ is inserted through the aperture $A^2$ of piece $A^9$ and then through that of the disk O, glides between the teeth $N^1$ and $R^1$ of the disks N, R, which are pushed a little from the right to the left and finally passes through the aperture of the plate M. The teeth are engaged in the different grooves $B^4$ of the bar $B^1$ and prevent any backing of the same. The grooves $B^4$ are sufficiently close together to prevent any play when the mark is fixed into the ear of the animal. The bar $B^1$ will be hidden by the parts A, B in order to make it inaccessible. Thanks to the form given to the part B and to the piece $A^9$ of part A there remains on both sides of the perforation $Q^1$ of the ear Q certain gaps S, T filled with air which facilitate, as experience has proved, the cicatrizing of the perforation. Finally the cone $A^{10}$ is more difficult to cut than a hemispheric portion would be.

Having now described my invention, what I claim as new and desire to secure by Letters Patent is:

A cattle mark comprising a male part having a bowl portion and a plane rim, a pointed piercing bar having a plurality of circular grooves mounted in said male part, a hollow female part with a conical formed hood and having a convex inner portion extending toward said bowl of the male part and being formed to press the ear of an animal into said bowl portion in such a manner as to leave an air gap on either side of the ear adjacent the perforation, said female part having also an aperture through which said bar is adapted to be inserted, and a device within said female part for gripping and retaining said bar after its insertion through said aperture, said device comprising a plurality of disks, said disks being provided with teeth arranged in such manner that the teeth of one disk are displaced with regard to the teeth of any adjacent disk, said teeth being adapted to engage with a plurality of said circular grooves in the bar, and a protection plate on either side of said toothed disks, said toothed disks and said protection plates being mounted with provision for a certain play within said female part to permit the latter to be freely turnable around said disks and plates, said male and female parts and said disks and plates being adapted to render the said piercing bar inaccessible from the outside, substantially as described.

In testimony whereof I affix my signature in presence of two witnesses.

EUGÈNE DELAY.

Witnesses:
 ROD. DE WERTEMBERGER,
 EDW. EMMANUEL.